US012424676B2

(12) United States Patent
Rahman O C et al.

(10) Patent No.: US 12,424,676 B2
(45) Date of Patent: Sep. 23, 2025

(54) ENERGY STORAGE DEVICE AND A METHOD FOR MANUFACTURING THE SAME

(71) Applicant: TVS MOTOR COMPANY LIMITED, Chennai (IN)

(72) Inventors: Safeer Rahman O C, Chennai (IN); Shanmugasundaram Sevanthilingam, Chennai (IN); Pramila Rao Nileshwar, Chennai (IN); Samraj Jabez Dhinagar, Chennai (IN)

(73) Assignee: TVS Motor Company Limited, Chennai (IN)

( * ) Notice: Subject to any disclaimer, the term of this patent is extended or adjusted under 35 U.S.C. 154(b) by 761 days.

(21) Appl. No.: 17/620,478

(22) PCT Filed: Jun. 18, 2020

(86) PCT No.: PCT/IN2020/050536
§ 371 (c)(1),
(2) Date: Dec. 17, 2021

(87) PCT Pub. No.: WO2020/255167
PCT Pub. Date: Dec. 24, 2020

(65) Prior Publication Data
US 2022/0255158 A1 Aug. 11, 2022

(30) Foreign Application Priority Data
Jun. 19, 2019 (IN) .............................. 201941024302

(51) Int. Cl.
H01M 10/653 (2014.01)
H01M 10/613 (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC .. H01M 10/613; H01M 10/65; H01M 10/653; H01M 10/654
See application file for complete search history.

(56) References Cited

U.S. PATENT DOCUMENTS 11,398,653 B2 * 7/2022 Phlegm ............... H01M 50/293
2015/0086832 A1 3/2015 Yang
(Continued)

FOREIGN PATENT DOCUMENTS

CN 105356004 A 2/2016
CN 105811046 A 7/2016
(Continued)

OTHER PUBLICATIONS

International Search Report issued in corresponding International Application No. PCT/IN2020/050536, mailed on Oct. 20, 2020 (3 pages).
(Continued)

Primary Examiner — Amanda C. Walke
(74) Attorney, Agent, or Firm — Osha Bergman Watanabe & Burton LLP

(57) ABSTRACT

An energy storage device includes: an outer casing lined with a conductive thermal foam; and a cell assembly including at least one cell holder structure and a plurality of energy storage cells held in the holder structure and being thermally connected by a phase change material. The cell assembly being contained within the outer casing. The conductive thermal foam and the phase change material fill empty spaces within the outer casing in a ratio of 15% to 85%.

7 Claims, 6 Drawing Sheets

(51) Int. Cl.
  *H01M 10/625* (2014.01)
  *H01M 50/204* (2021.01)
  *H01M 50/213* (2021.01)
  *H01M 50/224* (2021.01)
  *H01M 50/231* (2021.01)
  *H01M 50/271* (2021.01)

(52) U.S. Cl.
  CPC ....... *H01M 50/204* (2021.01); *H01M 50/213* (2021.01); *H01M 50/224* (2021.01); *H01M 50/231* (2021.01); *H01M 50/271* (2021.01); *H01M 2220/20* (2013.01)

(56) References Cited

U.S. PATENT DOCUMENTS

| | | | | |
|---|---|---|---|---|
| 2018/0212222 A1* | 7/2018 | Barton | ............. | H01M 50/3425 |
| 2018/0223070 A1* | 8/2018 | O'Neil | ................. | H01M 50/24 |
| 2020/0106143 A1* | 4/2020 | Juzkow | ............... | H01M 10/659 |
| 2020/0287252 A1* | 9/2020 | Li | ..................... | H01M 10/6552 |
| 2021/0257690 A1* | 8/2021 | Kilhenny | .......... | H01M 10/6551 |
| 2023/0082962 A1* | 3/2023 | Kang | ................ | H01M 10/0481 429/90 |

FOREIGN PATENT DOCUMENTS

| | | | | |
|---|---|---|---|---|
| CN | 106252787 B | * | 3/2019 | .......... H01M 10/613 |
| CN | 109802194 A | | 5/2019 | |
| DE | 102018009445 A1 | * | 6/2019 | |
| DE | 102018202946 A1 | * | 8/2019 | .......... H01M 10/613 |
| EP | 4087027 A2 | * | 11/2022 | .......... H01M 10/613 |
| JP | 2018098074 A | * | 6/2018 | |
| KR | 20170138204 A | * | 12/2011 | |
| WO | WO-2019160541 A1 | * | 8/2019 | ............. C01B 32/00 |
| WO | WO-2022018739 A1 | * | 1/2022 | .......... H01M 10/613 |
| WO | WO-2023217786 A1 | * | 11/2023 | .......... H01M 10/613 |

OTHER PUBLICATIONS

Written Opinion issued in corresponding International Application No. PCT/IN2020/050536, mailed on Oct. 20, 2020 (7 pages).

* cited by examiner

ENERGY STORAGE DEVICE AND A METHOD FOR MANUFACTURING THE SAME

TECHNICAL FIELD

The present subject matter generally relates to an energy storage device. More particularly, but not exclusively, the present subject matter relates to an energy storage device and a method for manufacturing the same.

BACKGROUND

Typically, lead-acid batteries are used as a cheap power source in different products e.g. vehicles, power tools, fork lifts, etc. In a vehicle, lead acid batteries are typically used for powering a starter motor of the internal combustion engine, or a motor etc. However, their low energy density, and their inability to reject heat adequately, makes them an impractical power source especially for electric vehicles. Particularly, electric vehicles using lead acid batteries have a short range. In addition, electric vehicles using lead-acid batteries have sluggish acceleration, poor tolerance to deep discharge, and low battery lifetime.

As a result of the disadvantages associated with lead acid batteries, energy storage devices containing lithium ion batteries have become increasingly popular in many products, including in various commercial electronic devices, owing to their ability to be recharged, weightlessness and high energy density. However, storing and operating the energy storage devices containing lithium ion batteries at an optimal operating temperature is very important to allow the device to retain charge for an extended period of time and allow faster charging rates.

Typically, an energy storage device such as a lithium ion battery pack comprises a battery unit composed of one or more energy storage cells electrically connected with one another in either series or parallel connection, or a combination of series connections and parallel connections. Typically, said battery pack comprises of one or more holder structures for holding one or more energy storage cells.

During operative conditions of said battery pack, the current flows through the battery unit(s) to power the device or product. As current is drawn off the battery unit(s), heat is generated within said battery pack. Also, during charging of said battery pack, heat is likewise accumulated during the charging process. The heat generated during discharge of the battery unit(s) as well as charging of the battery unit(s), leads to increased temperatures causing a severe effect on the life expectancy and performance of the battery unit(s). Thus, when one or more energy storage cell goes into thermal runaway, either through violation of safe temperature limit, manufacturing process induced cell short circuit, over charge or depending on the type of material used for manufacturing the holder structure for the cells, the amount of energy released may cause adjacent energy storage cells to also go into thermal runaway, this chain reaction destroys the battery pack. This can lead to safety risk and potential fatal accident for the user of the product which is highly undesirable.

BRIEF DESCRIPTION OF THE DRAWINGS

The detailed description is described with reference to an embodiment for a two-wheeled vehicle as a product, accompanied by corresponding figures. The same numbers are used throughout the drawings to reference like features and components.

DETAILED DESCRIPTION

Figure 1:
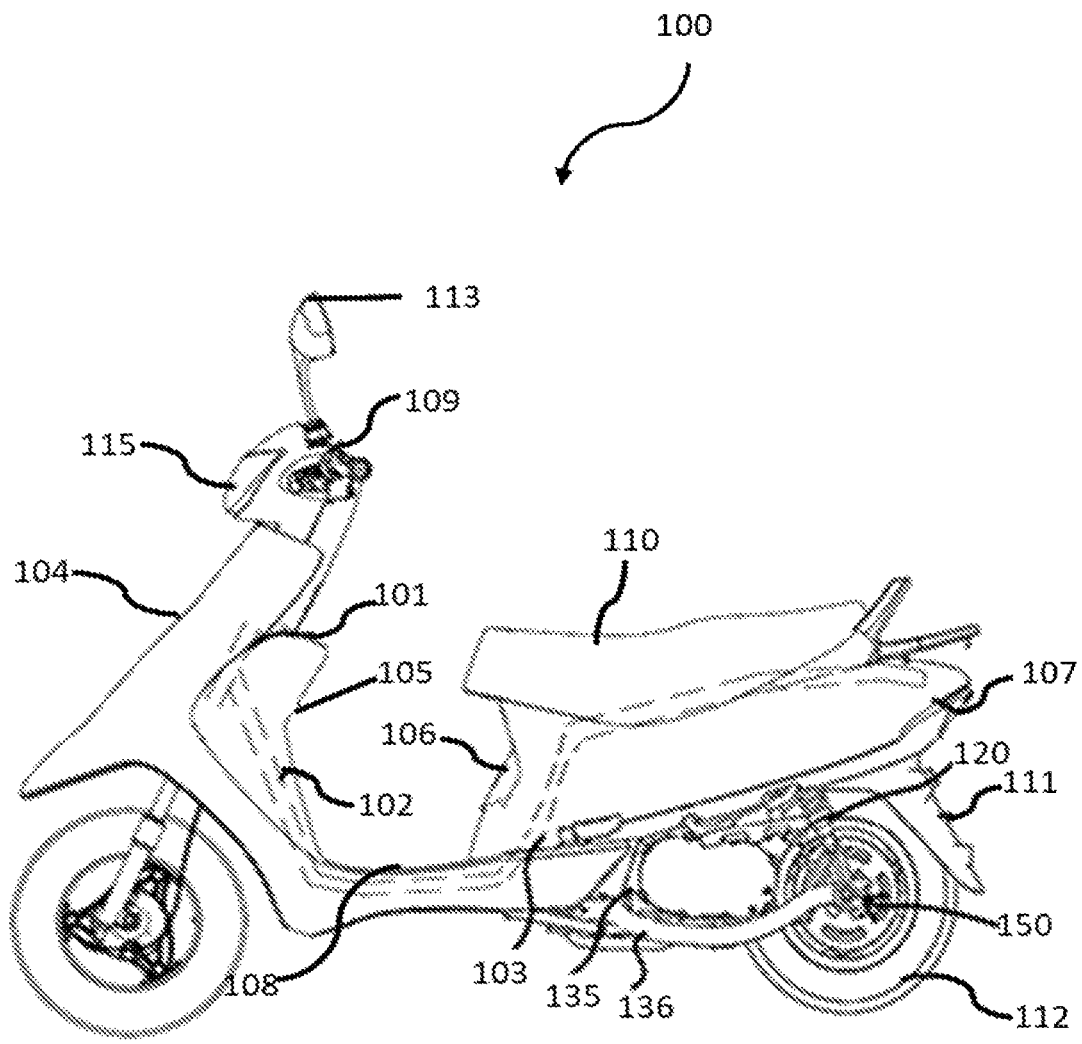
FIG. 1 is a side view of a saddle-type vehicle including an energy storage device in accordance with an embodiment of the present invention.

Typically, an energy storage device such as a battery pack comprises a cell assembly comprised of at least one holder structure configured to hold a plurality of energy storage cells therein. Typically, said energy storage cells are placed in said at least one cell holder and the same is inserted into an outer casing made up of a rigid material such as a metal of high conductivity. Generally, a major portion of said at least one cell holder is placed apart from the outer casing with a minimum air gap of 5 mm. In such an energy storage device, cooling structures in the form of fins are formed in at least a portion of sidewalls of said outer casing. The heat generated during charging and discharging process of said one or more the energy storage cells is effectively dissipated through said cooling structures. Often the heat generated during charging and discharging process of said energy storage cells, especially Li ion cells is so high that it leads to melting of electrical components within said holder structure, resulting in electric short circuit within the battery pack. While providing an Aluminum outer casing for said energy storage cells aids in dissipating heat from the energy storage cells, however, the presence of air gap between the cell assembly comprising said energy storage cells and the Aluminum outer casing hinders efficient dissipation of heat to the Al casing as air is a bad thermal conductor.

In a known structure for supporting said energy storage cells of the energy storage device, said at least one holder structure is provided with a phase change material (PCM). In said known structure, enmoulded PCM blocks are used for absorbing heat from said energy storage cells. As the latent heat of fusion of the phase change material (PCM) is high, it absorbs significant amount of heat without much rise in temperature. During charging and discharging of said energy storage device, the phase change material absorbs heat generated by said energy storage cells and hence changes its state from solid to liquid. However, due to its low thermal conductivity and poor heat dissipating properties, the use of PCM alone proves to be insufficient for effective heat dissipation from said energy storage cells and there exists a need to improve cooling rate of the battery pack. Moreover, when PCM is filled completely within the outer casing and around the cell assembly it leads to a substantial increase in weight of the energy storage device, and also results in substantial increase in cost of the energy storage device which is undesirable. An increase in weight of the energy storage device/battery pack leads to significant increase in weight of the device or product. This is especially critical for portable devices and products which require mobility e.g. electric vehicles where an energy storage device comprising a huge array of Li ion cells is used to power the vehicle.

Further, with use of enmoulded PCM blocks within the battery packs, the chances for the air gap between the outer casing and the cell holder assembly to increase is higher, as it is likely that a variance in shape/profile of the outer casing with respect to the shape/profile of the previously enmoulded block of PCM exists. In such cases the conduction of heat from the enmoulded PCM block to the outer casing will be very poor. Further, use of enmoulded PCM blocks entails greater cost of manufacturing and greater complexity in manufacturing. Also, in extreme conditions, the PCM melts causing leakage of PCM from the outer casing.

Therefore, there is a need for an energy storage device in which efficient cooling of energy storage cells is achieved while ensuring low cost of manufacturing and ease of manufacturing of said energy storage device.

With the above objectives in view, the present subject matter provides an energy storage device which is protected against thermal runaway and from damage to a cell assembly comprising a plurality of energy storage cells due to thermal runaway. Particularly, said energy storage device is designed to ensure efficient cooling rate of the cell assembly comprising said energy storage cells. Efficient cooling rate for the cell assembly is ensured by improving heat absorption over said energy storage cells and improving thermal conductivity from said energy storage cells to an outer casing holding said cell assembly. Further, while ensuring efficient cooling rate of the cell assembly, it is also ensured that the weight of the energy storage device does not go up and ease of manufacturing of the energy storage device is also ensured.

As per an aspect of the present subject matter, the energy storage device comprises a cell assembly enclosed in an outer casing which is secured by a pair of end cover members at its left end and right end. Particularly, said cell assembly comprises a plurality of energy storage cells which are placed in at least one cell holder structure, with said plurality of cells being electrically connected to one other by a plurality of interconnect members permanently attached to said cell holder structure. Further, said plurality of energy storage cells are thermally connected to one another by a Phase Change Material (PCM) which aids in uniform heat distribution throughout the cell assembly and in maintaining said plurality of energy storage cells at uniform temperature.

Further, the cell assembly comprising the plurality of energy storage cells which are electrically and thermally connected with one another is enclosed by an outer casing made of a rigid highly conductive material such as Aluminium. As per an aspect of the present subject matter, said outer casing of the energy storage device is lined with a highly conductive thermal foam. In an assembled condition of the cell assembly with the outer casing, the Phase Change Material thermally connecting said plurality of energy storage cells is maintained in thermal contact with said conductive foam material, thereby ensuring that heat absorbed by the PCM from said plurality of energy storage cells is effectively conducted to the outer casing, which finally dissipates heat generated within the energy storage device to the outside. Contact of the PCM with said conductive foam material enables in improving cooling rate of the energy storage device as heat is quickly conducted to the outer casing from the PCM by lining of said conductive thermal foam to the outer casing. Particularly, since the outer casing is lined with said conductive thermal foam and the same is in contact with the PCM, it is ensured that there is minimal air gap between the outer casing and the PCM thermally connecting said plurality of energy storage cells. Cooling rate of said plurality of energy storage cells is significantly increased as a result of maintaining minimal air gap between the outer casing and the PCM. As per an embodiment, the conductive foam is elastically biased against the outer casing as well as the energy storage cells which addresses any potential variations in dimensions of the parts thereby ensuring robust positive thermal contact. The biasing can be in form of a press fit configuration which can be in the volumetric range up to maximum 10% of the volume of the foam.

The present subject matter advantageously provides a method of manufacturing the energy storage device comprising a plurality of energy storage cells which are thermally connected and installed in an outer casing. Steps involved in the manufacture of said energy storage device firstly involves lining said outer casing with a highly conductive thermal foam. A second step in the method of manufacture of said energy storage device involves installing a cell assembly comprising a plurality of energy storage cells into said outer casing lined with said highly conductive thermal foam. Further, a third step involves pouring a Phase Change Material heated to a temperature above 50° C. into said outer casing which is lined with said conductive thermal foam and contains the cell assembly, allowing said PCM to flow into empty spaces/air gap between said plurality of energy storage cells and said at least a cell holder structure holding said cells. Subsequent to pouring said PCM heated to a temperature above 50° C., a predetermined curing time is allowed for the PCM to solidify and attain an ambient temperature of 30-35° C. Furthermore, a fourth step involves closing the outer casing lined with said conductive thermal foam and containing the cell assembly comprising said plurality of energy storage cells which are thermally connected to one other through the PCM; with an end cover.

Thus, the method of manufacturing the energy storage device involves a pre-step of lining the outer casing with said conductive thermal foam followed by post-step of filling said empty spaces between cell assembly comprising said plurality of energy storage cells and the outer casing lined with said conductive thermal foam. Lining the outer casing with said conductive thermal foam prior to thermally connecting said energy storage cells with PCM ensures that only empty spaces between said plurality of energy storage cells and empty spaces between said plurality of cells and said cell holder of the cell assembly will be filled with PCM rather than filling the entire volume of space which may be present between the cell assembly and the outer casing in the absence of said conductive thermal foam. Therefore, the present method of manufacturing the energy storage device ensures that only optimal volume of PCM is used for thermally connecting said plurality of energy storage cells, thereby ensuring that weight of the energy storage device does not go up significantly due to PCM filling significant internal volume of the outer casing. As per an aspect of the present subject matter, the density or specific gravity of the thermal foam is less than the density of the PCM thereby resulting in added benefit of weight reduction without compromising on heat dissipation efficiency. Further, pouring PCM into the outer casing lined with said conductive thermal foam in order to fill the empty spaces between the plurality of energy storage cells and between said energy storage cells and said cell holder structure rather than using enmoulded PCM blocks disposed over said plurality of energy storage cells for absorbing heat from said energy storage cells ensures ease of manufacturing the energy storage device, while also ensuring that cost of manufacturing is low.

Summary provided above explains the basic features of the invention and does not limit the scope of the invention.

Exemplary embodiments detailing features of the energy storage device configured for improved cooling rate of said plurality of energy storage cells contained therein in accordance with the present invention will be described hereunder. The embodiments described herein apply to a vehicle having an energy storage device such as a battery pack and powered by either a motor alone or by both internal combustion engine, and the motor. Also, although the embodiments have been exemplified for a two-wheeled saddle-type vehicle, the present invention is applicable for all types of portable devices as well as products with mobility having an energy storage device and powered by either a motor alone or by both the internal combustion engine, and the motor. The energy storage device/battery pack may be composed of Li ion cells and the like.

With reference to FIG. 1 a description is made of a vehicle 100 which is a hybrid two-wheeled saddle-type vehicle in accordance with an embodiment of the present invention. FIG. 1 is a side view said vehicle 100. Said vehicle 100 illustrated, has a step-through type frame assembly. The step-through type frame assembly includes a steering tube 101, a main tube 102 and a pair of side tubes 103. Particularly, the main tube 102 extends downwards from a rear portion of the steering tube 101 and then extends rearwards in an inclined manner. Further, the pair of side tubes 103 extends inclinedly upwardly from the main tube 102. Thus, the frame assembly extends from a front portion to a rear portion of the vehicle.

The vehicle 100 further includes a plurality of body panels for covering said frame assembly, and is mounted thereto. In the present embodiment said plurality of panels includes a front panel 104, a leg shield 105, an under-seat cover 106, and a left and a right, side panel 107. Further, a glove box may be mounted to said leg shield 105.

In a step through space formed between said leg shield 105 and said under seat cover 106, a floorboard 108 is provided. Further, a seat assembly 110 is disposed above said under-seat cover 106, and is mounted to the pair of side tubes 103. A utility box (not shown) is disposed below the seat assembly 110. A fuel tank (not shown) is positioned at one end of the utility box. A rear fender 111 for covering at least a portion of a rear wheel 112 is positioned below the utility box.

One or more suspension(s)/shock absorbers 120 are provided in a rear portion of said vehicle 100 for comfortable ride. Further said vehicle 100 comprises of plurality of electrical and electronic components including a headlight 115, a taillight (not shown), a transistor controlled ignition (TCI) unit (not shown), a starter motor (not shown) and the like. A touch screen LCD unit (not shown) is provided on a handle bar 109 to display various operating modes, power flow pattern and warning signals. Rear view mirrors 113 are mounted on the right and left sides of the handle bar 109. Said vehicle 100 is also provided with hazard lamps (not shown). Further said vehicle also includes an arc fault detection indicator (not shown) near the touch screen of the instrument cluster. The indicator glows on detection of any arc fault in the vehicle indicating that the vehicle would be disabled shortly.

An internal combustion engine 135, hereinafter "engine", is arranged behind said floorboard 108 and supported between the pair of side tubes 103. Particularly, said internal combustion engine 135 is supported by a swing arm 136. The swing arm 136 is attached to a lower portion of the main tube 102 by means of a toggle link (not shown). The other end of the swing arm 136 holds the rear wheel 112. The rear wheel 112 and the swing arm 136 are connected to the pair of side tubes 103 by means of one or more shock absorbers 120 provided on either side of said vehicle 100.

Said vehicle 100 further includes a traction motor 150 mounted on a hub of the rear wheel 112. Said traction motor 150 is powered by an energy storage device 200 (shown in FIG. 2) disposed in a rear portion of the vehicle. However, in another embodiment, the energy storage device 200 may be disposed in a front portion of the vehicle. The energy storage device 200 also powers all the electrical components of said vehicle 100. A motor control unit (MCU) (not shown) is also provided to control various vehicle operative modes.

Said vehicle 100 is configured to be propelled either by the engine 135 alone or by the traction motor 150 alone or by both engine 135 and traction motor 150 simultaneously. At zero vehicle speed, a rider can select any of the following four operating drive modes with the help of a mode switch. The four operating drive modes of said vehicle 100 are: (a) a sole engine mode where engine 135 alone powers the vehicle (b) a sole motor mode where the traction motor 150 alone powers the vehicle (c) a hybrid power mode wherein the engine 135 and the traction motor 150 together power the vehicle 100 (d) a hybrid economy mode wherein only the engine 135 or only the traction motor 150 or both power the vehicle depending on the vehicle operating conditions.

In other words, the rear wheel 112 of the vehicle is driven by either the engine 135 alone or by the motor 150 alone or by both the engine 135 and the motor 150 simultaneously. Particularly, power from the engine 135 to the rear wheel 112 is transmitted by a transmission assembly including a drive system (not shown) as per an embodiment of the present invention. However, when the traction motor 150 drives, power from the motor 150 is directly transmitted to the rear wheel 112. In the present embodiment, said traction motor 150 is covered by a motor shroud (not shown) from at least one side.

Figure 2:
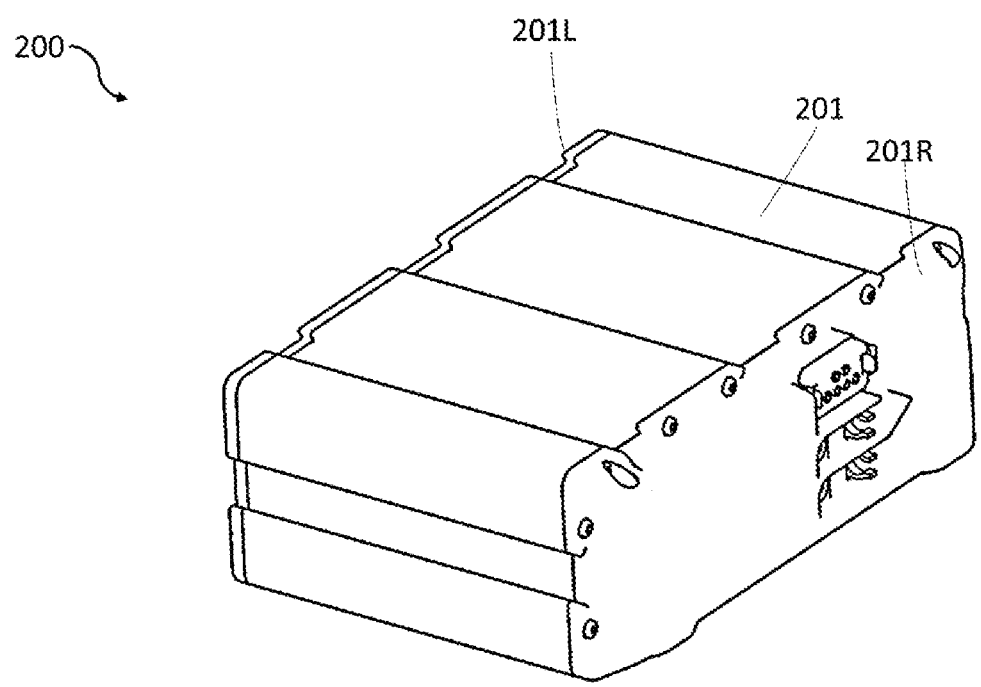
FIG. 2 is a perspective view of an energy storage device as per an embodiment of the present invention.

Referring to FIG. 2, description is made of a schematic representation of the energy storage device 200 of said vehicle 100 as per an embodiment of the present invention. FIG. 2 is a perspective view of an energy storage device 200, as per an embodiment of the present invention. As per an embodiment and as may be seen in FIG. 2 said energy storage device 200 configured to supply power to the traction motor 150 and other electrical components of said vehicle 100 comprises an outer casing 201 to accommodate a cell assembly 202 (shown in FIG. 3) comprising a plurality of energy storage cells 202b (shown in FIG. 3) therein. The outer casing 201 thus encompassing the cell assembly 202 is covered at its left and right ends by a pair of end cover members 201L 201R. In another embodiment, said energy storage device 200 is configured to power the vehicle. Particularly, multiple number of above described energy storage devices stacked together may be used to power the vehicle. In the present embodiment too, multiple numbers of above described energy storage device are stacked together for powering the traction motor and other electrical components of the vehicle 100.

Figure 3:
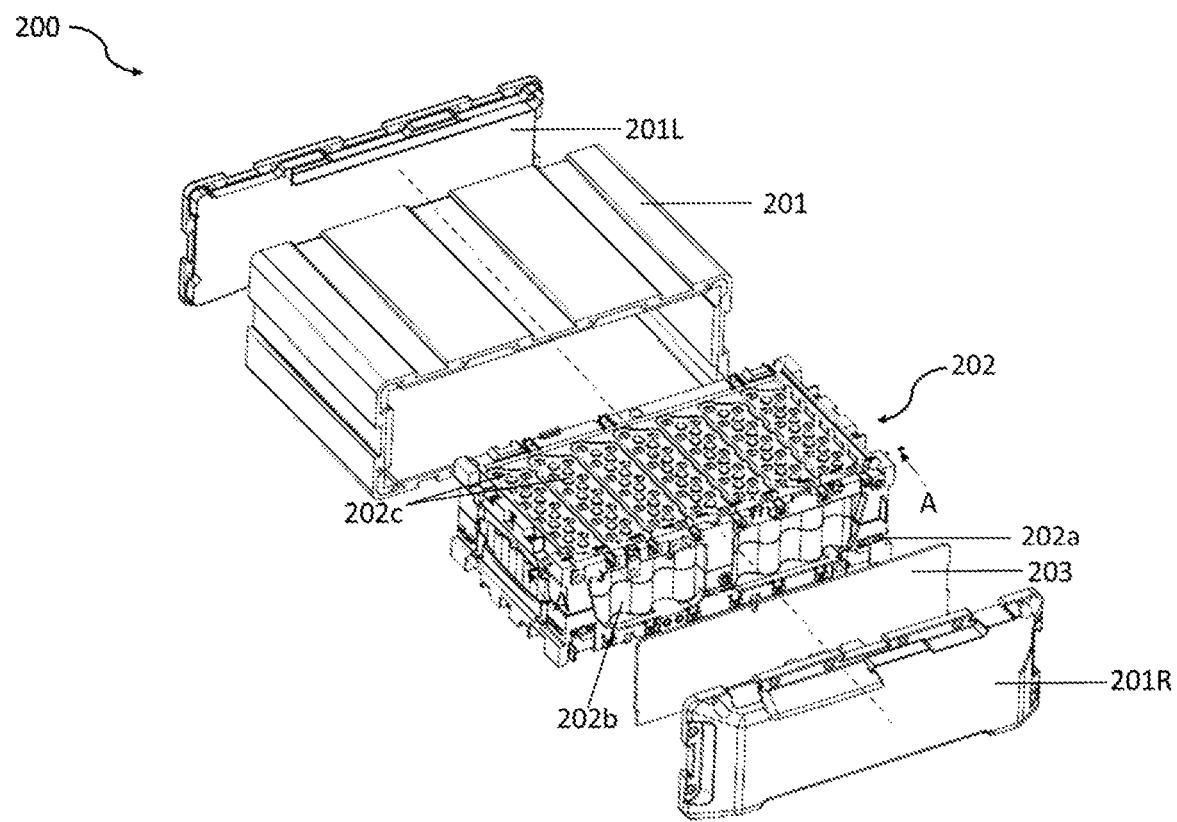
FIG. 3 is an exploded view of said energy storage device as per an embodiment of the present invention.

FIG. 3 is an exploded view of said energy storage device 200 as per one embodiment of the present invention. In one embodiment and as may be seen in FIG. 3, said energy storage device 200 comprises said outer casing 201 for accommodating a cell assembly 202. Said cell assembly comprises at least one holder structure 202a for holding said plurality of energy storage cells 202b. Said energy storage cells 202b are arranged in slots formed in said at least one cell holder structure 202a. Said cells 202b thus arranged are electrically connected by a plurality of interconnect members 202c disposed over each row of said cells 202b and permanently attached to at least a portion of said at least one holder structure 202a. To one portion of said cell assembly 202, a control unit 203 is provided which aids in controlling operation of the energy storage device 200. The cell assembly 202 thus comprising said plurality of energy storage cells 202b and attached to said control unit 203 is inserted into said outer casing 201 of the energy storage device 200. In an embodiment, said outer casing 201 is made of rigid highly conductive material such as metal Aluminium. Further, said outer casing 201 is provided with said pair of end cover members 201L, 201R for enclosing said cell assembly 202 within said outer casing 201.

Figure 4:
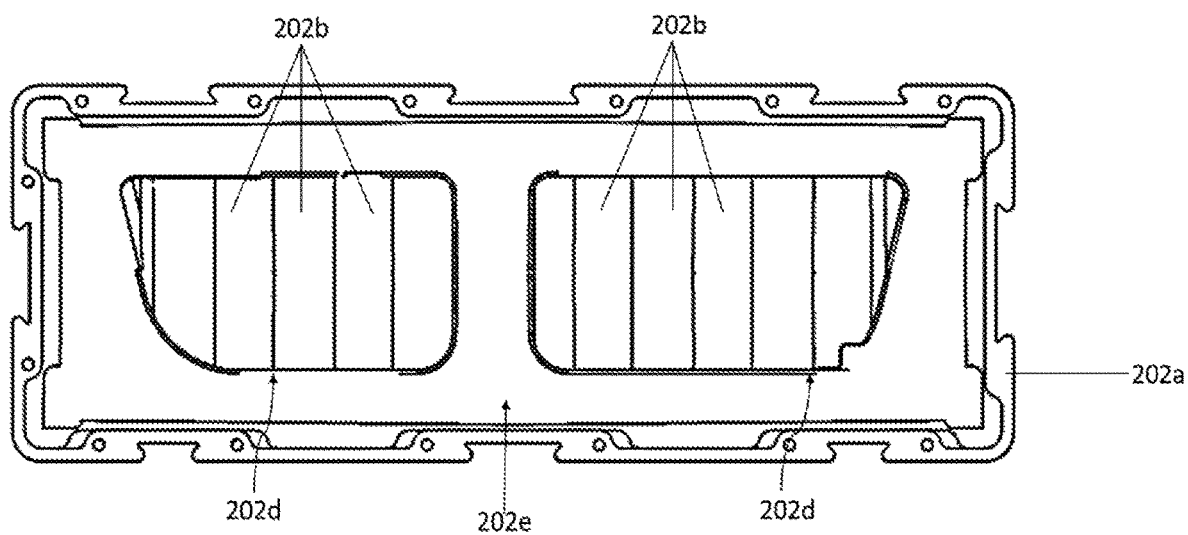
FIG. 4 is a cross sectional view depicting a portion of a cell assembly of said energy storage device comprising empty space as per an embodiment of the present invention.

FIG. 4 illustrates a cross sectional view of a portion of the cell assembly 202 taken along a line A-A in FIG. 3. Said cell assembly 202 as may be seen includes a number of empty spaces including a first set of empty spaces 202d and a second set of empty spaces 202e between said plurality of energy storage cells 202b and between said plurality of cells 202b and at least a portion of said holder structure 202a respectively. In other words, typically air gap exists between each of said cells of said plurality of energy storage cells 202b and between said cells 202b and at least a portion of said cell holder structure 201a. Further empty space/air gap is also present between said cell assembly 202 and an inner surface of said outer casing 201, in an assembled condition of said cell assembly 202 inside said outer casing 201.

During operative conditions of said energy storage device 200, the current flows through said cells 202b to power the vehicle or to power different components of the vehicle. As current is drawn off said cells 202b, heat is generated within said cell assembly 202. Presence of air gap/empty spaces (202d,202e) between said cells 202b and between said cells and at least a portion of said cell holder structure affects the dissipation of heat from said cells 202b to said outer casing 201 (shown in FIG. 3), thereby leading to heat buildup within said cell assembly 202 and within said outer casing 201. Heat buildup within said cell assembly 202 can lead to thermal runaway of cells, and finally lead to destruction of said energy storage device 200.

Figure 5:
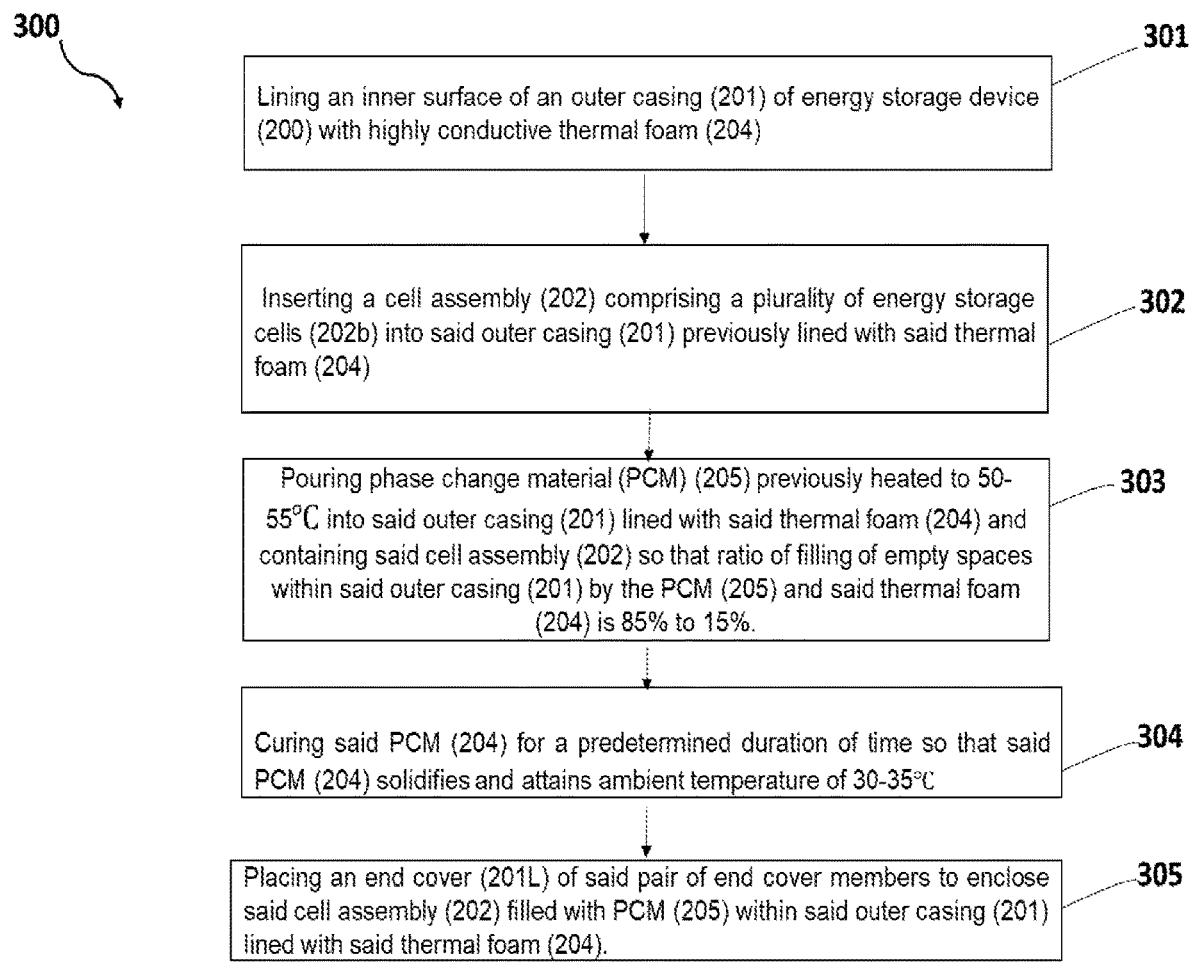
FIG. 5 is a flowchart depicting method of manufacturing said energy storage device as per an embodiment of the present invention.

In order to prevent thermal runaway of said cells and to improve rate of cooling of said cells, the present subject matter provides a method of manufacturing of said energy storage device 200 as per one embodiment. FIG. 5 illustrates a flowchart 300 depicting steps involved in method of manufacturing said energy storage device 200. A first step of said method depicted at block 301 involves lining said outer casing with a highly conductive thermal foam 204 (shown in FIG. 6) e.g. silicon foam. Lining said outer casing 201 with a highly conductive thermal foam 204 in a same profile as that of said cell assembly 202 ensures that empty space/air gap between said outer casing 201 and said cell assembly 202 is minimized. As per one embodiment, a highly conductive adhesive thermal foam having specific gravity <0.25 is used to line said inner surface of said outer casing 201. For example, in an embodiment said thermal foam 204 lining said inner surface of said outer casing 201 has a thickness in the range of 2 mm-5 mm. Further, a second step depicted at block 302 involves installing/inserting said cell assembly 202 within said outer casing 201 previously lined with said thermal foam 204 and closing one end of said outer casing 201 with one end cover member 201R of said pair of end cover members. A third step of said method depicted at block 303 involves pouring a Phase Change Material 205 (shown in FIG. 6) having phase transition temperature in the range of 50-55° C. and having specific gravity >1 into said outer casing 201 lined with said thermal foam 204 and containing said cell assembly 202 therein. In other words, a phase change material previously heated to 50-55° C. is poured into said outer casing previously lined with said thermal foam. As per an embodiment, the volume of PCM 205 to be poured into said outer casing to fill empty spaces in the cell assembly 202 is determined based on pre-calculated volume of empty spaces i.e. first set of empty spaces 202d (shown in FIG. 4) and second set of empty spaces 202e (shown in FIG. 4) in the cell assembly. A fourth step of said method involves allowing a predetermined curing time for the PCM 205 filled between said cells 202b of said cell assembly and between said cells and at least one holder structure 202a of said cell assembly to solidify and attain an ambient temperature of 30-35° C. (see block 304). Typically, as per an embodiment a curing time of 1.5-2 hours is allowed for the PCM 205 to solidify. Further, a fifth step of said method and as depicted in block 305 involves placing an end cover 201L of said pair of end cover members to enclose said cell assembly 202 filled with PCM 205 within said outer casing 201 lined with said thermal foam 204. Provision of said thermal foam 204 also helps in preventing leakage of PCM 205 from said outer casing 201 in cases when PCM melts.

Figure 6:
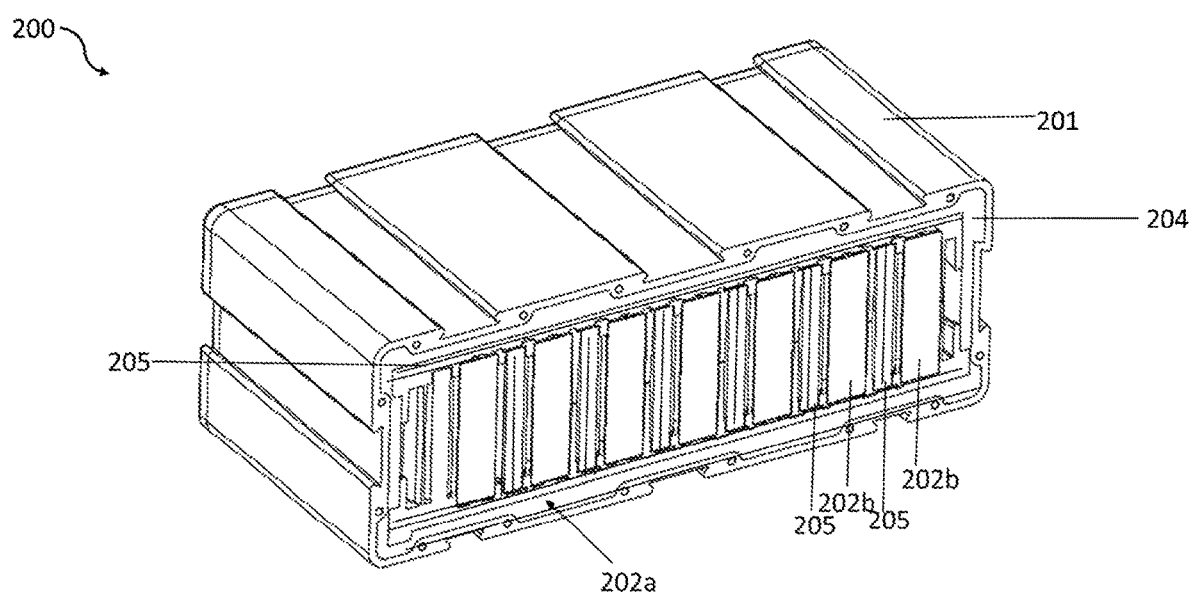
FIG. 6 is a cross sectional view of the energy storage device depicting at least a portion of the cell assembly without empty space as per an embodiment of the present invention.

FIG. 6 illustrates a cross sectional view of an energy storage device prepared/manufactured as per the steps described in FIG. 5. As may be seen the PCM 205 fills said first set of empty spaces 202d between said cells 202b and fills said second set of empty spaces 202e between said cells 202b and at least a portion of said cell holder structure 202a. Thus, the PCM 205 thermally connects said plurality of energy storage cells 202b in said cell assembly 202. Particularly, as per an embodiment, a ratio of filling of empty spaces within said outer casing by the PCM 205 and said thermal foam 204 is in range of 85% to 15% to achieve best thermal dissipation efficiency. In other words, while majority of air gap within said cell assembly is filled by the PCM, air gap between outer casing 201 and the cell assembly 202 is filled by said thermal foam 204. Thus, as PCM 205 does not completely fill the volume of empty space in the cell assembly 202 and between the cell assembly 202 and the outer casing 201, it is ensured that weight of the energy storage device 200 does not go up significantly. Moreover, since said highly conductive thermal foam 204 is used to line said outer casing 201, it is ensured that heat absorbed by the PCM 205 is effectively conducted to the outer casing 201 by said foam 204, thereby ensuring improved cooling rate of said plurality of energy storage cells 202b. Also, since PCM 205 is poured in liquid form over the cell assembly 202 and is allowed to subsequently get solidified, ease of manufacturing of the energy storage device is ensured in comparison to devices where enmoulded/machined PCM blocks are used in the cell assembly. Thus, cost of moulding/machining of PCM blocks is avoided and low cost of manufacturing of the energy storage device is ensured. Moreover, since PCM is poured into the outer casing rather inserting cell assembly comprising pre-moulded/pre-machined into the outer casing, it is ensured that problem of variance in profiles of said outer casing and said pre-moulded/machined PCM blocks is avoided. This, in turn aids in ensuring that there is minimal air gap between the cell assembly and the outer casing, thereby ensuring effective heat transfer/conductivity from the PCM to the outer casing of the energy storage device. Thus, a hybrid heat dissipation system is configured for an energy storage device to improve its thermal dissipation efficiency thereby enhancing performance as well as durability of the energy storage device.

The present subject matter described herein thus advantageously provides an economical and easy method of manufacturing a low weight energy storage device with improved rate of cooling of energy storage cells contained therein, thereby ensuring improved performance of the energy storage device.

Improvements and modifications may be incorporated herein without deviating from the scope of the invention.

We claim:

1. An energy storage device comprising:
    an outer casing lined with a conductive thermal foam; and
    a cell assembly comprising at least one cell holder structure and a plurality of energy storage cells held in the cell holder structure, wherein
    the plurality of energy storage cells are thermally connected by a phase change material,
    the cell assembly are contained within the outer casing;
    the conductive thermal foam and the phase change material fill empty spaces within the outer casing in a ratio of 15% to 85%,
    the phase change material is between each of the plurality of energy storage cells,
    the phase change material is between the cell holder structure and the plurality of energy storage cells,
    the conductive thermal foam is between the cell assembly and the outer casing,
    the outer casing lined with the conductive thermal foam is configured to provide heat dissipation from the plurality of energy storage cells to the outer casing through the conductive thermal foam,
    the conductive thermal foam is configured to prevent leakage of the phase change material from the outer casing when the phase change material melts, and
    the phase change material surrounds the plurality of energy storage cells.

2. The energy storage device as claimed in claim 1, wherein the conductive thermal foam has a specific gravity less than that of the phase change material.

3. The energy storage device as claimed in claim 2, wherein the conductive thermal foam has a specific gravity of less than 0.25.

4. The energy storage device as claimed in claim 1, wherein the conductive thermal foam is designed to be pasted on an inner surface of the outer casing lining the cell assembly.

5. The energy storage device as claimed in claim 1, wherein the phase change material has a phase change temperature in a range of 50-55° C. and a specific gravity of more than 1.

6. The energy storage device as claimed in claim 1, wherein the conductive thermal foam is elastically biased against the outer casing as well as the cell assembly using a press fit configuration.

7. The energy storage device as claimed in claim 6, wherein the press fit configuration achieved is in a volumetric range of up to maximum 10% of a volume of the foam.

* * * * *